United States Patent
Kuwahara

(10) Patent No.: US 8,078,011 B2
(45) Date of Patent: Dec. 13, 2011

(54) IMAGE PROCESSING CIRCUIT AND MULTI-FUNCTION APPARATUS

(75) Inventor: Toyoaki Kuwahara, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 536 days.

(21) Appl. No.: 12/391,046

(22) Filed: Feb. 23, 2009

(65) Prior Publication Data

US 2009/0214139 A1 Aug. 27, 2009

(30) Foreign Application Priority Data

Feb. 25, 2008 (JP) ................................. 2008-042537

(51) Int. Cl.
*G06K 9/20* (2006.01)
(52) U.S. Cl. ........................................ 382/312; 382/305
(58) Field of Classification Search .......... 382/168–169, 382/245–246, 251, 305, 312; 358/1.9; 375/240.12; 345/560

See application file for complete search history.

(56) References Cited

U.S. PATENT DOCUMENTS

| 5,832,128 | A * | 11/1998 | Suzuki | 382/246 |
| 7,876,968 | B2 * | 1/2011 | Chang | 382/245 |

FOREIGN PATENT DOCUMENTS

| JP | 04074288 A | 3/1992 |
| JP | 06-215559 | 8/1994 |
| JP | 09-218820 | 8/1997 |
| JP | 10-210251 | 8/1998 |
| JP | 2002-099876 | 4/2002 |
| JP | 2005293495 A | 10/2005 |
| JP | 2006127110 A | 5/2006 |
| JP | 2006-244094 | 9/2006 |
| JP | 2008252669 A | 10/2008 |

* cited by examiner

*Primary Examiner* — Duy M Dang
(74) *Attorney, Agent, or Firm* — DLA Piper LLP (US)

(57) ABSTRACT

An image processing circuit for processing a two-dimensional image includes: a rearrangement unit rearranging pixels included in an input two-dimensional image; a main memory storing the rearranged two-dimensional image; and an image processor processing the two-dimensional image stored in the main memory. Here, the rearrangement unit rearranges the pixels so that when the two-dimensional image is divided into a plurality of blocks, the pixels included in the same block should be stored in an area specified by the same row address in the main memory.

7 Claims, 8 Drawing Sheets

SCANNING DIRECTION OF JPEG IMAGE

{ ---► SCANNING DIRECTION
NUMBER: ORDER IN RASTER DIRECTION

MAIN MEMORY (AFTER REARRANGEMENT)

{ ---► SCANNING DIRECTION
NUMBER: ORDER IN RASTER DIRECTION

IMAGE PROCESSING CIRCUIT AND MULTI-FUNCTION APPARATUS

BACKGROUND

1. Technical Field

The present invention relates to an image processing circuit and a multi-function apparatus having the image processing circuit.

2. Related Art

Images input from a scanner in a multi-function apparatus are often processed in the unit of frames. The image process is performed by scanning frame images stored in a memory.

In general, a DRAM (Dynamic Random Access Memory) is used as the memory storing the frame images. When it is intended to read data from the DRAM and a row address is specified, contents of a memory cell (one page) corresponding to the row are loaded to a buffer in the DRAM. The DRAM requires time for reading data from the memory cell, but reads the data stored once in the buffer at a high speed. An access to DRAM using this characteristic is called page-mode access. In the page-mode access, plural data can be read from the buffer at a high speed while changing a column address after once specifying the row address.

JP-A-2002-99876 discloses an image process of sequentially and successively scanning (hereinafter, referred to "two-dimensional scanning") pixels located neighborhood in a frame image stored in the memory.

However, the frame image stored in the memory is generally stored so that two-dimensionally arranged pixels correspond to two-dimensional addresses in the memory. Accordingly, when the frame image stored in the DRAM is two-dimensionally scanned, it is often scanned in such an order to overlap with a page boundary to make the page-mode access difficult. As a result, it is much time to two-dimensionally scan the frame image.

SUMMARY

An advantage of some aspects of the invention is that it provides a technique for enhancing a two-dimensional scanning speed of a two-dimensional image stored in a memory accessible in a page mode.

According to an aspect of the invention, there is provided an image processing circuit for processing a two-dimensional image, including: a rearrangement unit rearranging pixels included in an input two-dimensional image; a main memory storing the rearranged two-dimensional image; and an image processor processing the two-dimensional image stored in the main memory. Here, the rearrangement unit rearranges the pixels so that when the two-dimensional image is divided into a plurality of blocks, the pixels included in the same block should be stored in an area specified by the same row address in the main memory.

According to the above-mentioned image processing circuit, it is possible to enhance a two-dimensional scanning speed of a two-dimensional image stored in a memory accessible in a page mode.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference the accompanying drawings.

Figure 1:
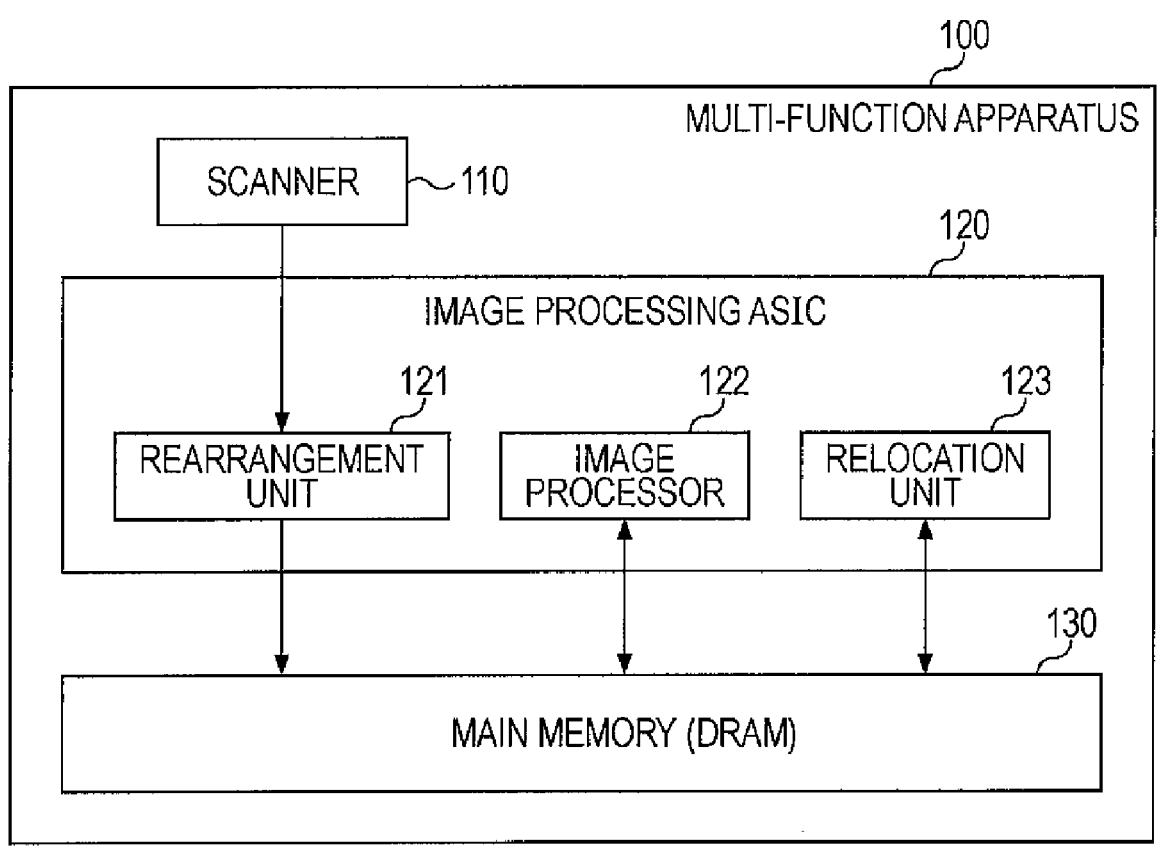
FIG. 1 is a diagram a hardware configuration of a multi-function apparatus according to an embodiment of the invention.

FIG. 1 is a block diagram illustrating a hardware configuration of a multi-function apparatus 100 to which an embodiment of the invention is applied.

As shown in the drawing, the multi-function apparatus 100 includes a scanner 110, an image processing ASIC (Application Specific Integrated Circuit) 120, and a main memory 130. The multi-function apparatus 100 has the same functions as known multi-function apparatuses such as a print function, a FAX function, a local print function, a network print function, and a copy function. To perform the functions, the multi-function apparatus 100 includes a CPU (Central Processing Unit) controlling the entire operations of the multi-function apparatus 100, a memory storing various programs and the like, a print engine controlling a printing operation, a network interface, and a FAC communicator, although not shown in the drawing.

The scanner 110 optically converts an original document such as photograph or illustration into digital data to generate image data. Specifically, the scanner 110 includes a scan head in which plural CCD sensors are arranged in a line and reads the original document corresponding to one line (one raster) by allowing the CCD sensors to scan the original document in its arrangement direction (raster direction). The scanner 110 supplies the read image data corresponding to one line (one raster) to the image processing ASIC 120. When reading the image data corresponding to one line (one raster), the scanner 110 moves the scan head in a sub scanning direction to read the image data in the next line. In this way, the scanner 110 repeats the main scanning and the sub scanning of the scan head and supplies the image data every raster to the image processing ASIC 120. In the following description, the respective pixels constituting the image data generated by the scanner 110 are one byte.

The image processing ASIC 120 includes a rearrangement unit 121, an image processor 122, and a relocation unit 123. The functional units may not be independent circuits but may perform the functions properly using circuits in common. Some processes performed by the image processing ASIC 120 may be performed by software.

The rearrangement unit 121 rearranges the pixels of the image data supplied from the scanner 110 in the unit of raster.

Figure 2A:
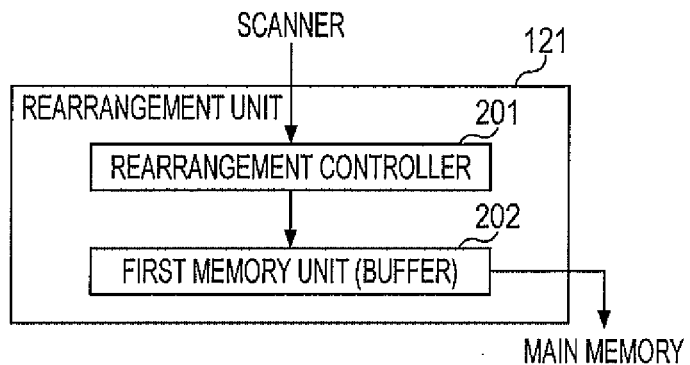
FIG. 2A is a diagram illustrating a functional configuration of a rearrangement unit and FIG. 2B is a diagram illustrating a rearrangement flow of the rearrangement unit.

FIG. 2A is a block diagram illustrating a functional configuration of the rearrangement unit 121. As shown in the drawing, the rearrangement unit 121 includes a rearrangement controller 201 and a first memory unit 202.

When receiving the image data corresponding to one raster from the scanner 110, the rearrangement controller 201 rearranges the pixels and stores the rearranged image data in the first memory 202. For example, the rearrangement controller 201 includes a circuit or a group of circuits.

Figure 2B:
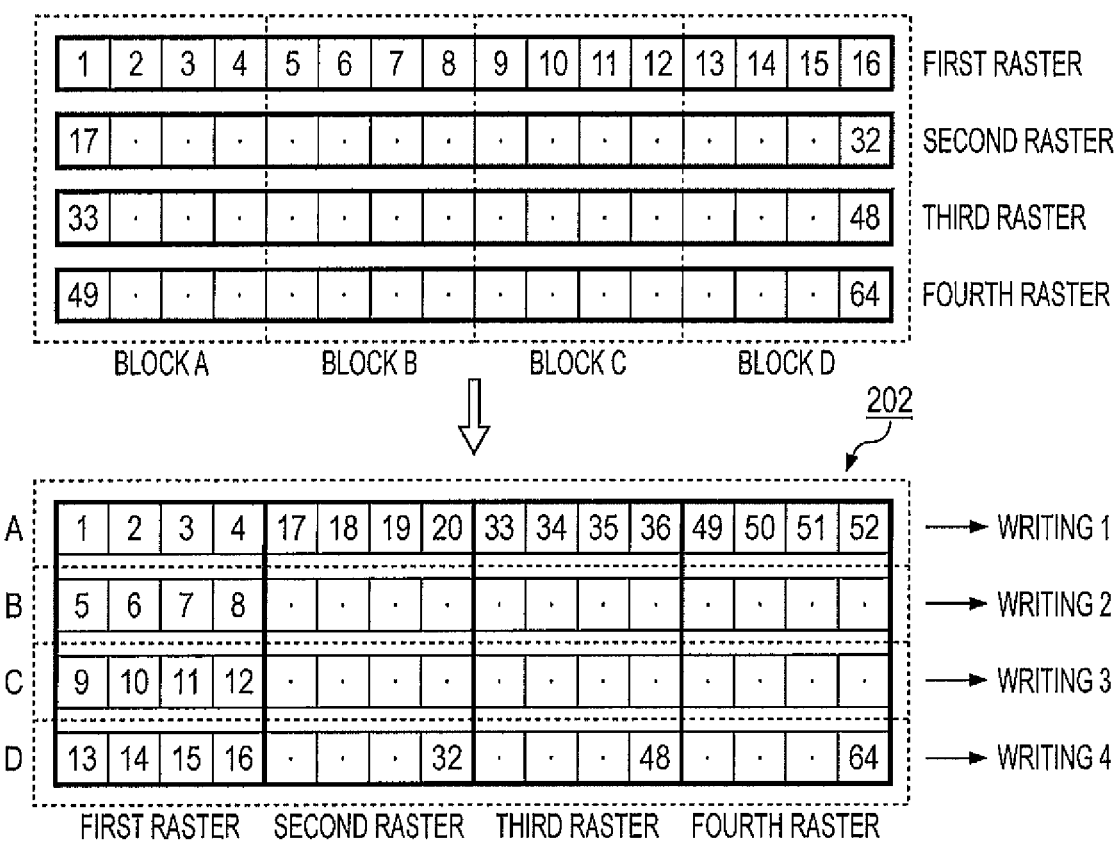

FIG. 2B is a diagram illustrating an arrangement order performed by the rearrangement controller 201. As shown in the drawing, when receiving the image data corresponding to one raster from the scanner 110, the rearrangement controller 201 equivalently divides the received image data corresponding to one raster into plural blocks (A to D). The number of divided blocks is determined in advance. In the example shown in the drawing, the image data corresponding to one raster includes 16 pixels and is divided into four blocks, but the invention is not limited to the example.

The rearrangement controller 201 stores the pixels included in the equivalently-divided blocks in different areas of the first memory unit 202 depending on the blocks. Specifically, as shown in the drawing, the rearrangement unit 201 stores the pixels (numbers "1" to "4") included in the first block A of four blocks, which the image data (for example, the first raster) is divided into, in the first row of the first memory unit 202. The pixels (numbers "5" to "8") included in the second block B are stored in the second row of the first memory unit 202. The pixels (numbers "9" to "12") included in the third block C are stored in the third row of the first memory unit 202. The pixels (numbers "13" to "16") included in the fourth block D are stored in the fourth row of the first memory unit 202.

When receiving the image data of the second raster from the scanner 110, the rearrangement controller 201 stores the received image data in the first memory unit 202 in the same order as the image data corresponding to the first raster. For example, the image data of the second raster is equivalently divided into four blocks and the pixels (numbers "17" to "20") included in the first block A are stored in the first row of the first memory unit 202. At this time, the image data of the second raster is stored successive to the position in which the image data of the first raster is stored (the pixel of number "17" is stored successive to the position of the pixel of number "4") The pixels includes in the second to fourth blocks B to D are similarly stored in the second to fourth rows of the first memory unit 202, respectively.

The rearrangement controller 201 stores the image data of the third raster and the fourth raster in the first memory unit 202 in the same order.

In the above-mentioned order, the rearrangement controller 201 rearranges the pixels of the image data supplied from the scanner 110 in the unit of raster. For example, in the example shown in FIG. 2B, the rearrangement controller 201 rearranges the pixels (pixels surrounded with a dotted frame shown at the upper end of FIG. 2B) included in the respective blocks A to D into an arrangement for arranging and storing the pixels in the same row of the first memory unit 202 (in the area surrounded with the dotted frame shown at the lower end of FIG. 2B).

When it is writable to the main memory 130, the rearrangement controller 201 writes the image data stored in the different areas (for example, the first to fourth rows) of the first memory unit 202 to the main memory 130. Here, the determination on whether it is writable to the main memory 130 depends on whether the number of rasters corresponding to the number of blocks into which the image data of one raster is divided is completely stored in the first memory unit 202. For example, when the image data of one raster is divided into four blocks and the image data of the fourth raster is completely stored in the first memory unit 202, it is writable to the main memory 130.

Referring to FIG. 2A again, the first memory unit 202 includes one or plural buffers and includes different areas corresponding to the number of blocks into which the image data of one raster is divided. For example, when the rearrangement controller 201 divides the image data of one raster into four blocks, the first memory unit 202 includes four different areas (or four buffers).

The image data (pixels) stored in the same area in the first memory unit 202 is arranged and output at the time of writing to the main memory 130 to be described later. Specifically, as shown in FIG. 2B, the pixels stored in the first row of the first memory unit 202 are arranged and output at the time of the first writing to the main memory 130 (writing 1). Similarly, the pixels stored in the second row to the fourth row of the first memory unit 202 are arranged and output at the time of the second to fourth writing to the main memory 130 (writing 2, writing 3, and writing 4).

Referring to FIG. 1 again, the main memory 130 stores the two-dimensional image data rearranged by the rearrangement unit 121. The main memory 130 is configured to specify two dimensional addresses (row address and column address) and to read and write data, similarly to known memory specifications. The main memory 130 is a memory that can read data in the unit of page (area specified by the same row address) by the above-mentioned page-mode access and is, for example, a DRAM.

The image data stored in the main memory 130 has the same data structure as the data structure (the lower end of FIG. 2B) of the image data rearranged and stored in the first memory unit 202. Specifically, the image data stored in the first row (writing 1 shown in FIG. 2B) of the first memory unit 202 is stored in the first row of the main memory 130. Similarly, the image data stored in the second and third rows of the first memory unit 202 is stored in the second and third row of the main memory 130, respectively.

The main memory 130 is configured to read and write data in the unit of 4 bytes and performs the data writing process from the rearrangement unit 121 or the data reading and writing process of the image processor 122 in the unit of 4 bytes. The invention is not limited to this example, but the data reading and writing process may be performed in the unit of 1 byte.

The image processor 122 of the image processing ASIC 120 variously processes the two-dimensional image data written to the main memory 130. Here, the various image processes are processes requiring the above-mentioned "two-dimensional scanning" and examples thereof include a character extracting process and a compressed image decoding process.

Figure 3:
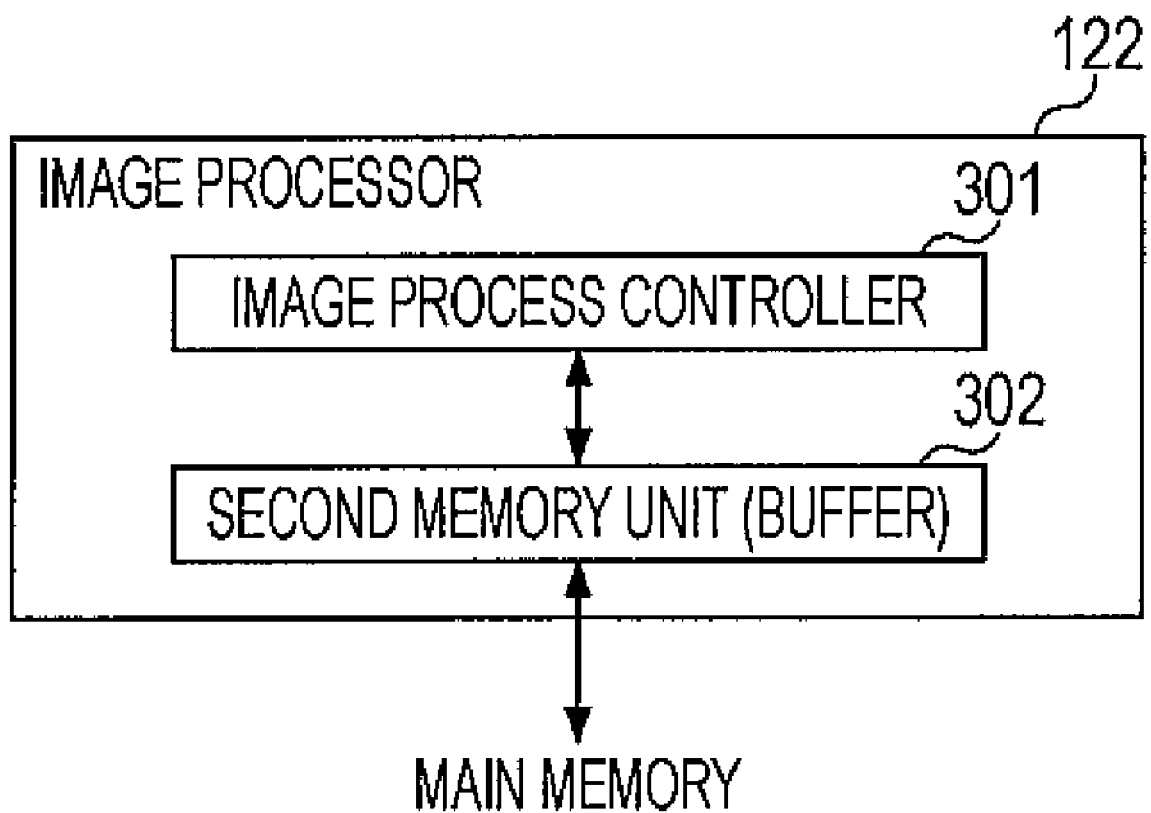
FIG. 3 is a diagram illustrating a function configuration of an image processor.

FIG. 3 is a block diagram illustrating a functional configuration of the image processor 122. As shown in the drawing, the image processor 122 includes an image process controller 301 and a second memory unit 302.

The image process controller 301 reads the two-dimensional image data stored in the main memory 130 into the second memory unit 302 in the unit of block and processes the read two-dimensional data. The image process controller 301 includes, for example, a circuit or a group of circuits.

Figure 4B:
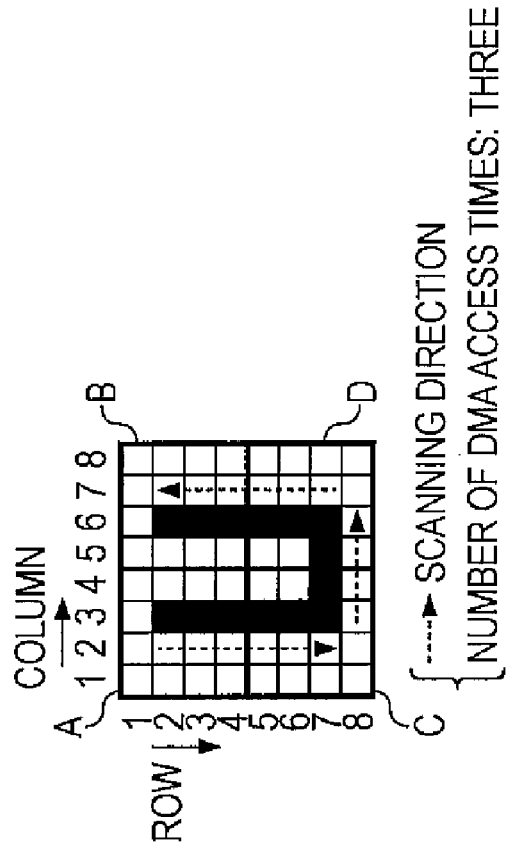
FIG. 4B is a diagram illustrating a character extracting process performed on the image data which is not rearranged.
Figure 4C:
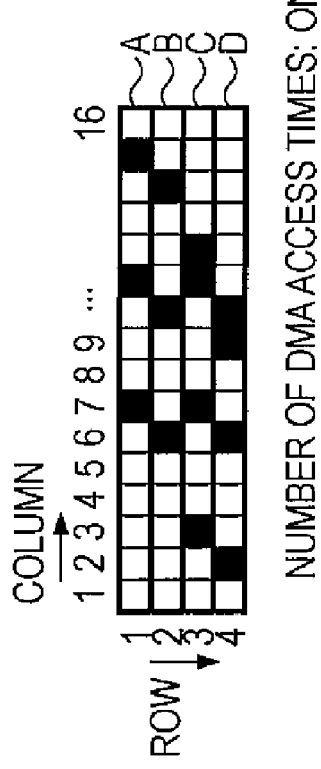
FIG. 4C is a diagram illustrating a character extracting process performed on the image data which is rearranged.
Figure 4A:
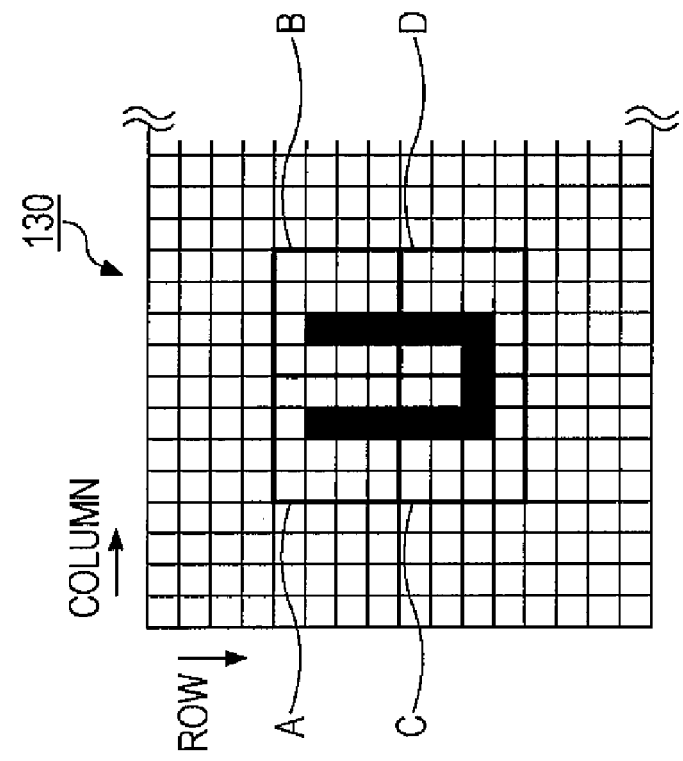
FIG. 4A is a diagram illustrating an image of image data (which is not rearranged)

FIGS. 4A to 4C are diagrams illustrating the image processes (mainly a character extracting process) performed by the image process controller 301.

FIG. 4A is a diagram illustrating an image of the image data stored in the main memory 130 when the rearrangement processor 121 does not rearrange the image data.

The image data stored in the main memory 130 is equivalently divided into 4×4 blocks shown in the drawing and is processed in the character extracting process. In FIGS. 4A to 4C, the pixels in which the character is written are colored with black.

When the character is extracted from the image data shown in FIG. 4A, the image process controller 301 recognizes a character or line by checking the connectivity of the pixels in which the character is written. The details of the character extracting process are described in JP-A-2002-99876 and thus will be described in brief.

FIG. 4B is a diagram briefly illustrating the process when the character is extracted from the image data not rearranged. As shown in the drawing, when extracting the character, the image process controller 301 sequentially scans the image data in a direction in which the pixels with the character written therein succeed (the scanning direction indicated by the dotted line). In the example shown in the drawing, the image process controller 301 scans the image data in the order of the pixel positioned at (3, 2), the pixel positioned at (3, 3), and the pixel positioned at (3, 4) in the main memory 130. The scanning for extracting the character corresponds to the above-mentioned "two-dimensional scanning."

The image process controller 301 reads the image data corresponding to four rows from the main memory 130 to the second memory unit 302 by one page-mode access at the time of two-dimensionally scanning the image data. Accordingly, when reading the image data shown in FIG. 4B from the main memory 130 to the second memory unit 302, the image process controller 301 can read the image data of one block (for example, block A or block B) to the second memory unit 302 by one page-mode access. However, in the one page-mode access, the shown row addresses (1 to 4) are simultaneously specified.

However, in the above-mentioned reading method, the image process controller 301 should read the image data to the second memory unit 302 in the order of block A, block C, block D, and block B when scanning the image data in the scanning direction indicated by the dotted line in FIG. 4B. When the image data of blocks A to D is read to the second memory unit 302 in this order, at least three page-mode accesses are required. Specifically, one page-mode access for specifying the row addresses 1 to 4 and reading the image data of block A, one page-mode access for specifying the row addresses 5 to 8 and reading the image data of block C and block D, and one page-mode access for specifying the row addresses 1 to 4 again to reading the image data of block B are required.

On the other hand, FIG. 4C is a diagram illustrating the process when the character is extracted from the image data rearranged by the rearrangement unit 121. As shown in the drawing, blocks A to D surrounded with the bold lines correspond to blocks A to D shown in FIG. 4B. Blocks A to D are arranged and stored in the area that can be specified with the same row address by the rearrangement unit 121. In the example shown in the drawing, the pixels included in block A shown in FIG. 4B are all stored in the area that can be specified with row address "1" shown in FIG. 4C. Similarly, the pixels included in blocks B to D shown in FIG. 4B are stored in the areas that can be specified with the same row addresses "2" to "4" by blocks.

Accordingly, when reading the image data to the second memory unit 302 in the order of block A, block C, block D, and block B, the image process controller 301 reads the image data of four rows of blocks A to D to the second memory unit 302 by only one page-mode access to the main memory 130. At this time, the image process controller 301 simultaneously specifies row addresses 1 to 4 shown in FIG. 4C.

Referring to FIG. 1 again, the relocation unit 123 relocates the arrangement of the image data rearranged by the rearrangement unit 121 into the arrangement before the image data is rearranged by the rearrangement unit 121 (the arrangement of the image data generated by the scanner 110).

Figure 5A:
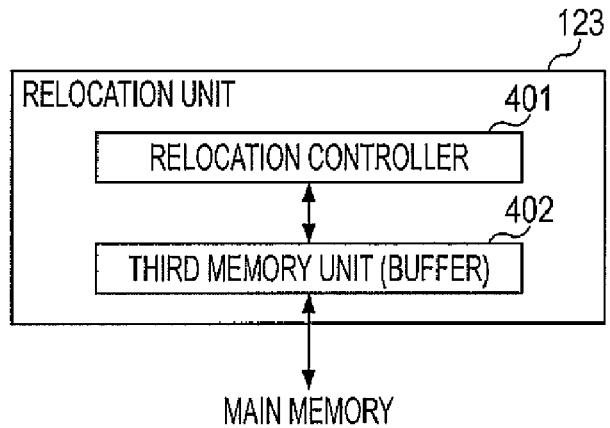
FIG. 5A is a diagram illustrating a functional configuration of a relocation unit and FIG. 5B is a diagram illustrating a relocation flow of the relocation unit.

FIG. 5A is a block diagram illustrating a function configuration of the relocation unit 123. As shown in the drawing, the relocation unit 123 includes a relocation controller 401 and a third memory unit 402.

The relocation controller 401 reads the image data processed by the image processor 122 from the main memory 130, relocates the pixels, and stores the relocated image data in the third memory unit 402. The relocation controller 401 includes, for example, a circuit or a group of circuits.

Figure 5B:
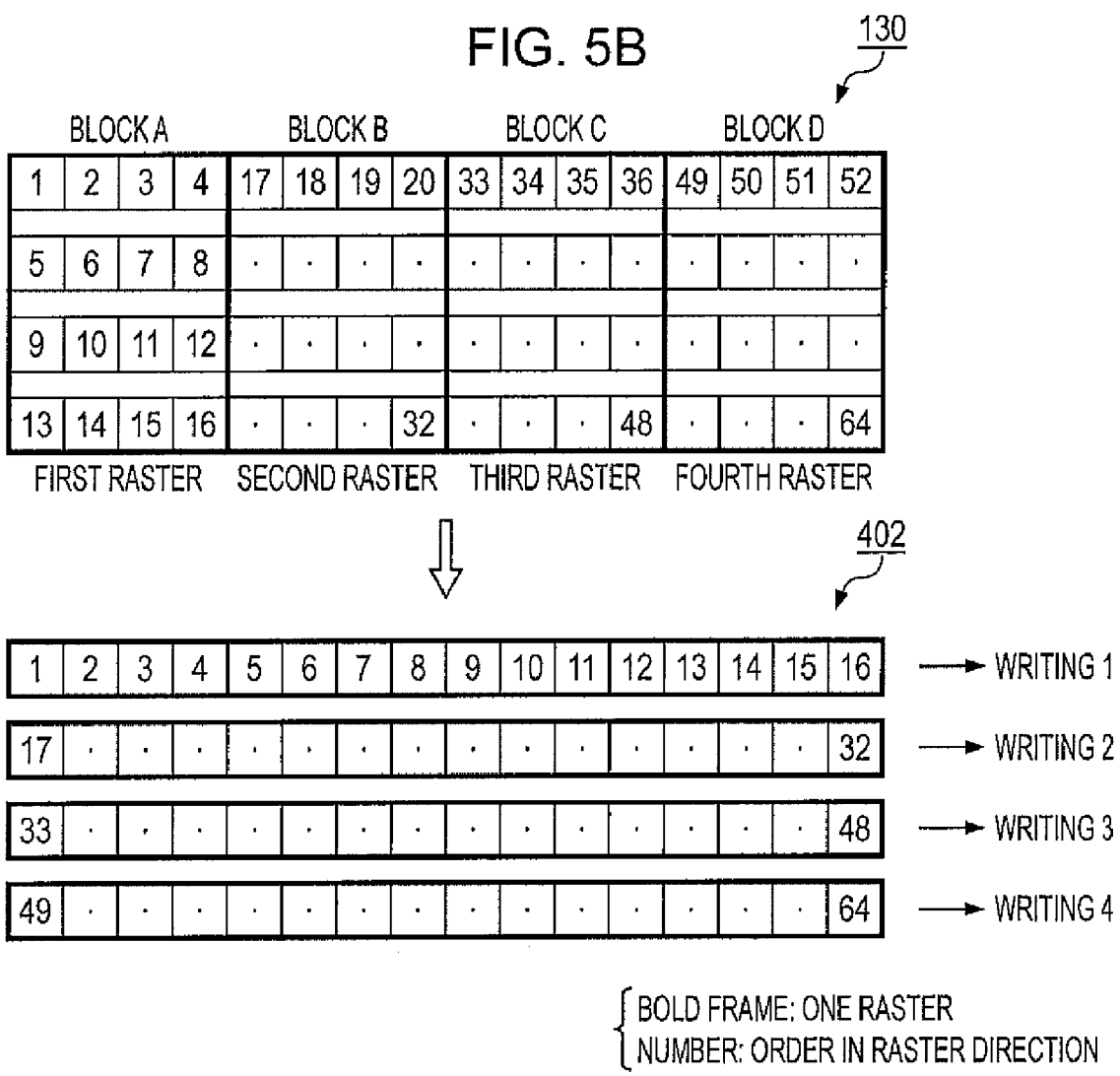

FIG. 5B is a diagram illustrating a flow of relocation performed by the relocation controller 401. As shown in the drawing, the relocation controller 401 equivalently divides the image data stored in the main memory 130 into plural blocks A to D. Here, equivalently-divided blocks A to D correspond to the divided blocks used for rearrangement of the rearrangement unit 201.

The relocation controller 401 stores the pixels included in the equivalently-divided blocks in different areas of the third memory unit 402 by blocks. Specifically, as shown in the drawing, the relocation controller 401 stores the pixels (pixels of numbers "1" to "16") included in the first block A of the blocks, which are obtained by equivalently dividing the image data into four blocks, as the image data of the first raster in the first row of the third memory unit 402. The pixels (pixels of numbers "17" to "32") included in the second block B are stored as the image data of the second raster in the second row of the third memory unit 402. The pixels (pixels of numbers "33" to "48") included in the third block C are stored as the image data of the third raster in the third row of the third memory unit 402. The pixels (pixels of numbers "49" to "64") included in the fourth block D are stored as the image data of the fourth raster in the fourth row of the third memory unit 402.

The relocation controller 401 writes the image data stored in the different areas (for example, the first to fourth rows) of the third memory unit 202 to the main memory 130.

Referring to FIG. 5A again, the third memory unit 402 includes one or more buffers to form different areas corresponding to the predetermined number of divided blocks. For example, when the relocation controller 401 divides the image data stored in the main memory 130 into four blocks, the third memory unit 402 includes four different areas (or four buffers).

The image data (the pixels) stored in the same area in the third memory unit 402 is arranged and output to the main memory 130. Specifically, as shown in FIG. 5B, the pixels of the first raster stored in the first row of the third memory unit 402 are arranged and output at the time of writing the image data to the first main memory 130 (writing 1). Similarly, the pixels of the second raster to the fourth raster stored in the second to fourth rows of the third memory unit 402 are arranged and output at the time of writing the image data to the second to fourth main memory 130 (writing 2, writing 3, and writing 4), respectively.

Figure 6:
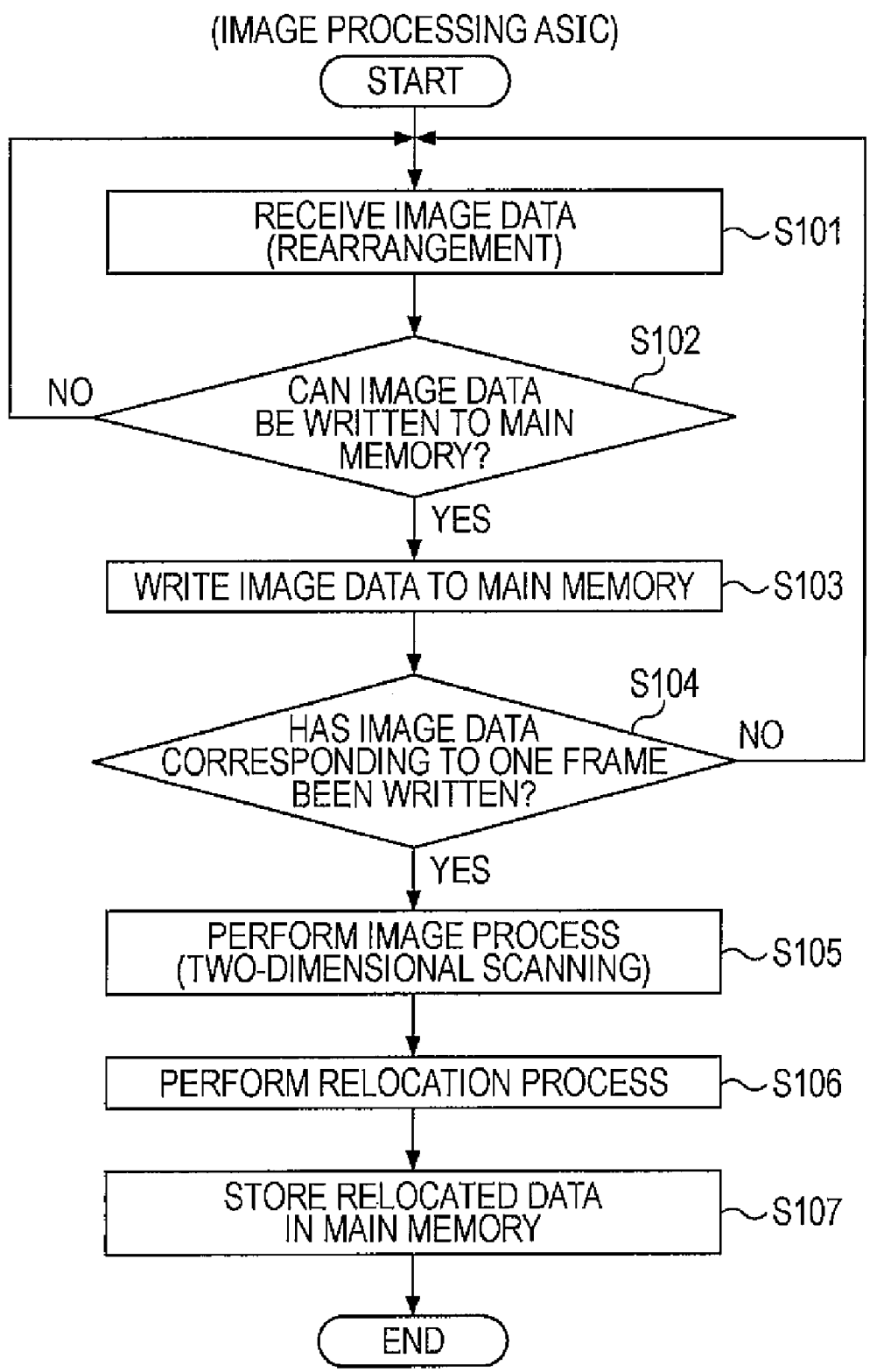
FIG. 6 is a flowchart illustrating an image process performed by an image processing ASIC.

Characteristic operations of the image processing ASIC 120 in the multi-function apparatus 100 having the above-mentioned configuration will be described now. FIG. 6 is a flowchart illustrating the image process performed by the image processing ASIC 120.

The image processing ASIC 120 starts the image process when the image data is supplied from the scanner 110.

First, the rearrangement unit 121 of the image processing ASIC 120 receives the image data from the scanner 110 in the unit of raster and performs a process of rearranging the received image data (step S101). Specifically, the rearrangement controller 201 divides the received image data into plural blocks and rearranges the image data so that the pixels included in the same block are stored in the area specified by the same row address of the first memory unit 202. For example, as shown in FIG. 2B, the rearrangement controller 201 rearranges the image data received from the scanner 110 and stores the image data in the first memory unit 202.

Then, the rearrangement unit 121 determines whether the image data stored in the first memory unit 202 is writable to the main memory 130 (step S102). Specifically, the rearrangement controller 201 counts the number of rasters of the image data stored in the first memory unit 202. The rearrangement controller determines whether the counted number of rasters is equal to the number of blocks (for example, "4") into which the image data of one raster is divided. When determining that both numbers are equal to each other (YES in step S102), the rearrangement controller 201 performs the process of step S103. On the other hand, when determining that both numbers are not equal to each other (NO in step S102), the rearrangement controller 201 receives the image data of the next row (one raster) from the scanner 110 again in step S101.

When the image data is writable to the main memory 130, the rearrangement unit 121 performs the process of writing the rearranged image data to the main memory 130 (step S103). Specifically, the rearrangement controller 201 arranges the image data stored in the area specified by the same row address in the first memory unit 202 and writes the arranged image data in the area specified by the same row address in the main memory 130. Accordingly, the rearrangement controller 201 can replicate the image data stored in the first memory unit 202 into the main memory 130 with the data structure maintained.

Then, the rearrangement unit 121 determines whether the image data corresponding to one frame is completely written to the main memory 130 (step S104). When determining that the image data is completely written to the main memory (YES in step S104), the rearrangement unit 121 performs the process of step S105. On the other hand, when determining that the image data is not completely written to the main memory (NO in step S104), the rearrangement unit receives the image data of the next row (one raster) from the scanner 110 again in step S101.

When the image data of one frame is stored in the main memory 130, the image processor 122 performs the image process on the stored image data (step S105) Specifically, the image process controller 301 reads the image data from the main memory 130 into the second memory unit 302 by blocks and performs the image process accompanied with the "two-dimensional scanning" on the read image data. For example, the image process accompanied with the "two-dimensional scanning" performed by the image processor 122 is the above-mentioned character extracting process.

The relocation unit 123 reads the image data having been processed by the image processor 122 from the main memory 130 and relocates the arrangement of the pixels to the original arrangement (step S106). Specifically, the relocation controller 401 divides the processed image data stored in the main memory 130 into plural blocks and relocates the arrangement so that the pixels included in the same block are stored in the area specified by the same row address in the third memory unit 402. For example, as shown in FIG. 5B, the relocation controller 401 relocates the arrangement of the processed image data stored in the main memory 130 and stores the relocated image data in the third memory unit 402.

Then, the relocation unit 123 stores the image data relocated and stored in the third memory unit 402 in step S105 in the main memory 130 (step S107). Specifically, the relocation controller 401 arranges the image data stored in the area specified by the same row address in the third memory unit 402 and stores the arranged image data in the area specified by the same row address in the main memory 130. Accordingly, the relocation controller 401 can replicate the image data stored in the third memory unit 402 into the main memory 130 with the data structure maintained.

Thereafter, the image processing ASIC 120 ends the image process. Here, for example, the multi-function apparatus 100 having a print function can print or copy the image stored in the main memory 130 in step S107.

By allowing the image processing ASIC 120 to perform the above-mentioned image process, the image data with the data structure suitable for the page-mode access can be generated in the two-dimensional scanning in the main memory 130. As a result, it is possible to enhance the two-dimensional scanning speed of the image data generated in the main memory 130.

The invention is not limited to the above-mentioned embodiment, but may be modified in various forms.

For example, in the above-mentioned embodiment, when receiving the image data of one raster from the scanner 110, the rearrangement controller 201 rearranges the received image data and stores the rearranged image data in the first memory unit 202. When the image data corresponding to a predetermined number of blocks is accumulated in the first memory unit 202, the rearrangement controller sequentially writes the accumulated image data corresponding to the predetermined number of blocks to the main memory 130. However, the invention is not limited to this operation.

Figure 7:
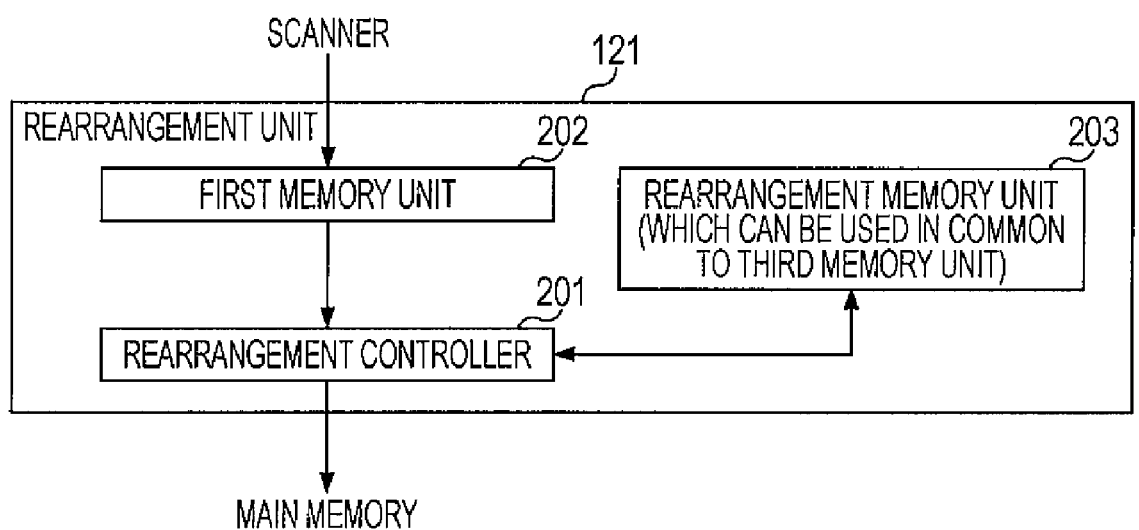
FIG. 7 is a diagram illustrating a functional configuration of the rearrangement unit where a rearrangement memory unit is additionally provided.

For example, FIG. 7 is a block diagram illustrating a rearrangement unit where a rearrangement memory unit 203 is added to the rearrangement unit 121 according to the above-mentioned embodiment. As shown in the drawing, the rearrangement unit 121 includes a rearrangement controller 201, a first memory unit 202, and a rearrangement memory unit 203.

The rearrangement memory unit 203 accumulates the image data rearranged by the rearrangement controller 201 by one frame.

When receiving the image data of one raster from the scanner 110, the rearrangement controller 201 of the rearrangement unit 121 having the above-mentioned configuration stores the received image data in the first memory unit 202 without rearranging the image data. The rearrangement controller 201 rearranges the image data stored in the first memory unit 202 and stores the rearranged image data in the third memory unit 203. Here, the same method as the rearrangement method of the above-mentioned embodiment is used as the rearrangement method. The data structure of the image data stored in the rearrangement memory unit 203 is the same as the data structure shown at the lower end of FIG. 2B. When the image data corresponding to one frame is accumulated in the rearrangement memory unit 203, the rearrangement controller 201 writes the accumulated image data corresponding to one frame to the main memory 130 with the data structure maintained.

In this way, by once accumulating the rearranged image data of one frame in the rearrangement memory unit 203 and then writing the accumulated image data to the main memory 130, it is possible to normally write the image data to the main memory 130, even when the supply speed of the image data from the scanner 110 to the rearrangement unit 121 is higher than the writing speed to the main memory 130.

By using (in common) the rearrangement memory unit 203 as the third memory unit 402 of the relocation unit 213, it is possible to effectively use the memory and to reduce the cost of the memory.

Instead of disposing the rearrangement memory unit 203 in the rearrangement unit 121, a part of the main memory 130 may be used as the rearrangement memory unit 203. Accordingly, it is possible to effectively use the memory and to reduce the cost of the memory.

In the above-mentioned embodiment, the character extracting process is described as an example of the image process performed by the image processor 212. However, the invention is not limited to the character extracting process. For example, the image process performed by the image processor 212 may be a process of decoding a JPEG image.

When the JPEG image is decoded, the image process controller 301 reads the JPEG image from the main memory 130 to the second memory unit 302 every 8×8 block and zigzag scans and decodes the pixels of the read block.

Figure 8A:
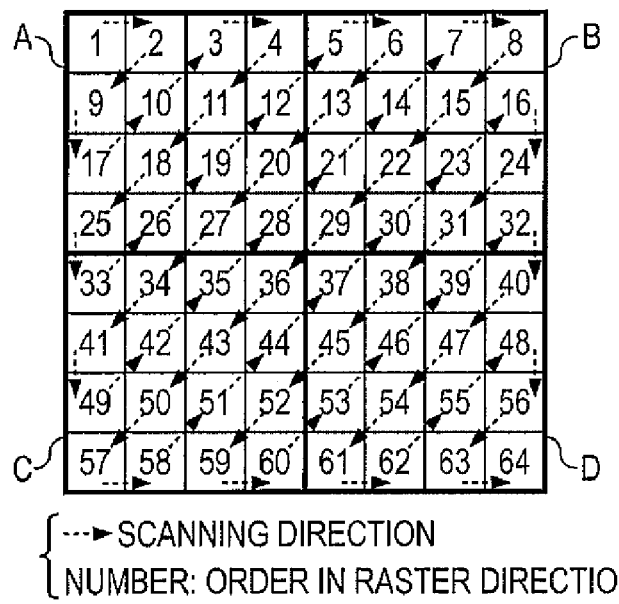
FIG. 8A is a diagram illustrating a scanning direction of a zigzag scanning operation and FIG. 8B is a diagram illustrating a data structure of a JPEG image which is rearranged.

FIG. 8A is a diagram illustrating a general scanning direction when the JPEG image stored in the main memory 130 is zigzag scanned. As shown in the drawing, the zigzag scanning corresponds to the "two-dimensional scanning" of sequentially and successively scanning the pixels located in the vicinity.

At the time of two-dimensionally scanning the JPEG image, the image process controller 301 reads the JPEG image corresponding to four rows (in the unit of block) from the main memory 130 to the second memory unit 302 by one page-mode access.

Therefore, when the JPEG image is zigzag scanned in the scanning direction indicated by a dotted line in FIG. 8A, the image process controller 301 should read the image data into the second memory unit 302 in the order of block A, block C, block A, block B, block A, block C, ... surrounded with a bold frame. When it is intended to read the JPEG image of the blocks (A to D) into the second memory unit 302 in this order, at least ten page-mode accesses are required. Specifically, five page-mode accesses of specifying row addresses 1 to 4 and reading the image data of block A or block B and five page-mode accesses of specifying row addresses 5 to 8 and reading the image data of block C or block D are required.

Figure 8B:
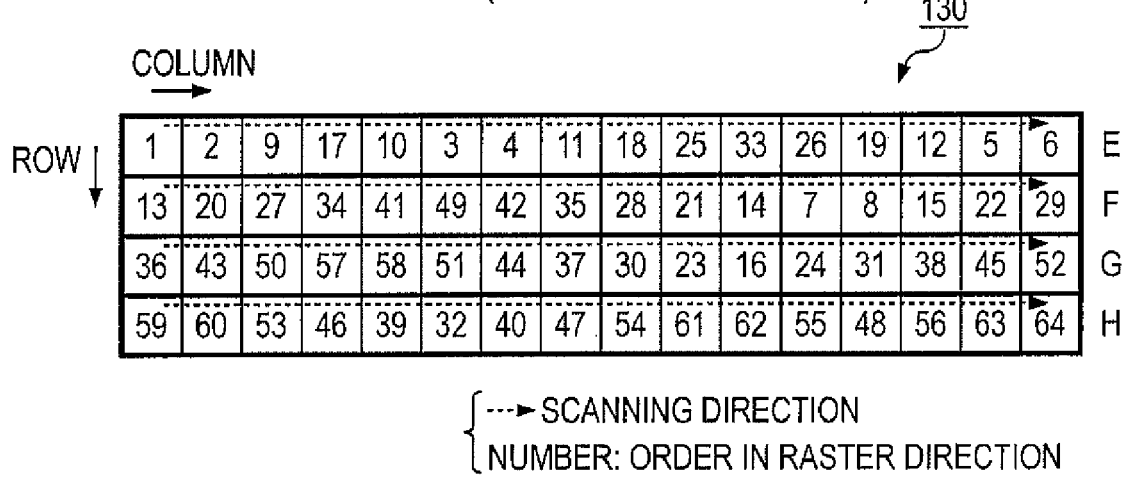

On the other hand, FIG. 8B is a diagram illustrating the data structure of the JPEG image rearranged by the rearrangement unit 121 and stored in the main memory 130. As shown in the drawing, a predetermined number of (for example, 16) pixels successive in the zigzag scanning order are arranged and stored in blocks E to H surrounded with a bold line. That is, when receiving the JPEG image from the scanner 110, the rearrangement unit 121 rearranges the JPEG image so that 16 pixels successive in the zigzag scanning order are stored in the area specified by the same row address in the main memory 130. Accordingly, when reading the JPEG image into the second memory unit 302 in the order of block A, block C, block A, block B, block A, block C, ... at the time of decoding, the image process controller 301 can read the image data of four rows corresponding to blocks E to H into the second memory unit 302 by only one page-mode access to the main memory 130.

The entire disclosure of Japanese Patent Application No. 2008-042537, filed Feb. 25, 2008 is expressly incorporated by reference herein.

What is claimed is:

1. An image processing circuit for processing a two-dimensional image, comprising:
a rearrangement unit rearranging pixels included in an input two-dimensional image;
a main memory storing the rearranged two-dimensional image; and
an image processor processing the two-dimensional image stored in the main memory,
wherein the rearrangement unit rearranges the pixels so that when the two-dimensional image is divided into a plurality of blocks, the pixels included in the same block should be stored in an area specified by the same row address in the main memory.

2. The image processing circuit according to claim 1, further comprising a relocation unit relocating the pixels, which are rearranged by the rearrangement unit, of the processed two-dimensional image into an original arrangement.

3. The image processing circuit according to claim 1, wherein the rearrangement unit includes a rearrangement controller and a temporary memory unit, and
wherein the rearrangement controller rearranges the pixels of the input two-dimensional image, stores the rearranged two-dimensional image in the temporary memory unit, and outputs the stored two-dimensional image to the main memory in the unit of blocks.

4. The image processing circuit according to claim 1, wherein the two-dimensional image is a character image,
wherein the rearrangement unit rearranges the pixels so that when the character image is divided into a plurality of blocks, the pixels included in the neighbored blocks are stored in an area specified by the same row address in the main memory in the unit of blocks, and
wherein the image processor specifies the same row address in the main memory and extracts a character feature of the character image.

5. The image processing circuit according to claim 1, wherein the two-dimensional image is a JPEG image,
wherein the rearrangement unit rearranges the pixels in the JPEG image so that a predetermined number of pixels succeeding in an zigzag scanning order at the time of decoding are stored in an area specified by the same row address in the main memory, and
wherein the image processor specifies the same row address in the main memory and decodes the JPEG image.

6. The image processing circuit according to claim 1, wherein the main memory is a DRAM.

7. A multi-function apparatus having a scanner and an image processing circuit for processing a two-dimensional scanned image read by the scanner, comprising:
a rearrangement unit rearranging pixels included in the two-dimensional scanned image input from the scanner;
a main memory storing the rearranged two-dimensional scanned image; and
an image processor processing the two-dimensional image stored in the main memory,
wherein the rearrangement unit rearranges the pixels so that when the two-dimensional scanned image is divided into a plurality of blocks, the pixels included in the same block should be stored in an area specified by the same row address in the main memory.

* * * * *